(12) United States Patent
Compaijen et al.

(10) Patent No.: US 11,087,102 B2
(45) Date of Patent: Aug. 10, 2021

(54) SYSTEM OF RFID READER UNITS TRANSMITTING SYNCHRONIZED MODULATION USING ASYNCHRONOUS CARRIER WAVES

(71) Applicant: N.V. Nederlandsche Apparatenfabriek NEDAP, Groenlo (NL)

(72) Inventors: Paul Jasper Compaijen, Deventer (NL); Maarten Jacobus Johannes van Megen, Enschede (NL); Berend Hendrik Essink, Varsseveld (NL); Reinbrand Gerhard Jaakob Frans Ottokar Johanan van Lakwijk, Arnhem (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 210 days.

(21) Appl. No.: 16/151,616

(22) Filed: Oct. 4, 2018

(65) Prior Publication Data
US 2019/0138770 A1 May 9, 2019

(30) Foreign Application Priority Data
Oct. 5, 2017 (NL) ...................... 2019672

(51) Int. Cl.
*G06K 7/08* (2006.01)
*G06K 7/10* (2006.01)

(52) U.S. Cl.
CPC ..... *G06K 7/10366* (2013.01); *G06K 7/10069* (2013.01); *G06K 7/10079* (2013.01); *G06K 7/10297* (2013.01)

(58) Field of Classification Search
CPC .................................................. G06K 7/10366
USPC .......................................................... 235/451
See application file for complete search history.

(56) References Cited

U.S. PATENT DOCUMENTS

| | | | |
|---|---|---|---|
| 9,384,376 B2 | 6/2016 | Sabesan et al. | |
| 2004/0150510 A1 | 8/2004 | Taki et al. | |
| 2010/0207736 A1 | 8/2010 | Park et al. | |
| 2014/0292494 A1 | 10/2014 | Sadr et al. | |

(Continued)

OTHER PUBLICATIONS

Dutch Search Report and Written opinion, dated Jun. 19, 2018 (8 pages).

*Primary Examiner* — Jamara A Franklin
(74) *Attorney, Agent, or Firm* — Jacobson Holman PLLC

(57) ABSTRACT

A UHF RFID system is disclosed in which an RFID transponder or tag can be simultaneously powered and interrogated by multiple RFID transceivers. The architecture of the system is such that each transceiver generates its own carrier wave, with a frequency that might be equal to or different from the other units, and the interrogation data is distributed throughout a network of transceivers and modulated by each transceiver unit onto their own carrier waves. During an interrogation period, one or more of the transceivers will be configured as the master unit, generating and distributing the protocols commands. The other units can be configured as transmitters, receivers or transceivers. After each period the units may be given different roles. The proposed setup yields a system with the capability to power and interrogate RFID tags with multiple readers, without compromising the required modulation depth and protocol handling.

25 Claims, 6 Drawing Sheets

(56) References Cited

U.S. PATENT DOCUMENTS

2016/0126753 A1    5/2016   Wight et al.
2017/0235982 A1*   8/2017   Kruest ............. G06K 19/07798
                                                                     235/451

* cited by examiner

SYSTEM OF RFID READER UNITS TRANSMITTING SYNCHRONIZED MODULATION USING ASYNCHRONOUS CARRIER WAVES

This invention relates to a preferably Ultra High Frequency (UHF) radio frequency identification (RFID) system comprising multiple RFID reader units, in which the units can generate carrier waves which are modulated by interrogation data to be received by tags. More particularly the invention relates to a system of RFID reader units, comprising a plurality of reader units at least comprising a first reader unit provided with a transmitter for transmitting an electromagnetic interrogation signal comprising a carrier wave which is modulated with interrogation data for interrogating an RFID tag and at least one second reader unit provided with a transmitter for transmitting an electromagnetic interrogation signal comprising a carrier wave which is modulated with interrogation data for interrogating an RFID tag wherein the system is arranged to receive a reply signal generated by an RFID tag in response to a carrier wave modulated with an interrogation signal received by the tag.

BACKGROUND ON THE INVENTION

Over the past years, the application of radio frequency signals for identification purposes was shown to have a large benefit for logistical purposes. Radio Frequency Identification (RFID) can be applied to identify, locate and track objects. Of particular interest is Ultra High Frequency (UHF) RFID, since it allows large reading distances and high data rates. This invention is in the field of RFID, more particularly UHF RFID.

A conventional RFID reading system comprises an RFID interrogator (reader unit) and one or more transponders, commonly referred to as labels or tags. In many implementations the transponders are passive, meaning that they extract their operating power from the RF field supplied by the reader unit, and the communication from the transponder back to the reader unit is based on modulated backscattering of the transmitted signal. This invention relates to powering and interrogating passive (UHF) RFID tags.

A consequence of passive (UHF) RFID is a limited detection range. For logistical purposes it is crucial that all articles distributed over a large area can be identified and located. In addition, often the articles are packed closely together and environments are commonly challenging for RF signals. To achieve full area coverage and a high reading accuracy in such environments, in general, an RFID system will comprise multiple reader units in close proximity. However, whereas a tag can be collectively powered by the RF fields transmitted by multiple independent reader units, generally it will have difficulty to interpret the mix of interrogation data generated by each independent reader unit. The latter will decrease the likelihood of a successful tag interrogation and diminish the added value of applying multiple RFID reader units. The invention described here relates to techniques to generate optimal benefit of the operation of multiple RFID reader units simultaneously.

PRIOR ART

To date, several approaches to solve this problem have been pursued. According to US 2014/0292494 A1 tags are interrogated using a distributed exciter network. This system comprises a high performance receiver unit and multiple simple exciter units. The receiver unit transmits control signals to the exciter units and determines the operation specifics of the exciters. Using multiple exciters ensures that sufficient forward power can be supplied to the tags, and the high sensitivity of the receiver ensures that even replies of tags that are situated far away can still be received.

Another approach is given in US 009384376 B2. Here, a distributed antenna system is applied to interrogate the tags with multiple antennas which are transmitting coherent carrier waves with identical data. The system layout is such that an RFID reader unit contains multiple antenna ports, which can be used for either transmitting or receiving. The antennas are distributed over the area of interest and should be connected via coaxial cables in order to transmit the radio frequency carrier waves to the antennas. This approach benefits from the coherent addition of the carrier waves to supply sufficient power to the tags.

Yet another approach is shown in US 2016/0126753 A1. This invention also makes use of the benefits obtained from coherent transmission of the signal from multiple readers. However, in this case it is achieved by frequency locking the oscillators of multiple reader units, allowing the reader units to coherently transmit their signals to the tags. US 2016/9373012 B2 discloses a system communicating from a controller, a target location to a first synthesized-beam RFID reader and to a second synthesized-beam RFID reader. Responsive to the communicated target location, a first beam is steered from the first synthesized-beam reader to the target location and a second beam is steered from the second synthesized-beam reader to the target location. The first synthesized-beam reader transmits a modulated RF inventory signal and the second synthesized-beam reader transmits simultaneously a substantially unmodulated RF signal. A tag reply signal is received at one of the first and second synthesized-beam readers. A disadvantage of this system relates to modulation depth issues compromising the read rate All of the solutions mentioned above, help in supplying sufficient power to the tags and interrogating tags in a challenging environment. However, all of them have several disadvantages which make them less ideal in certain use cases. In the case of US 2014/0292494 A1, the fact that the receiver and exciters are physically different units makes the solution less scalable. Additionally, a very sensitive receiver is also very receptive to external disturbance. Solutions proposed in US 009384376 B2 and US 2016/0126753 A1 both apply the principle of coherent addition of electromagnetic fields to obtain optimal benefit of the usage of multiple transmitters. In US 009384376 B2 this is achieved by distributing the radio frequency signal to multiple antennas with the aid of coaxial cabling. In many situations this is undesired due to the added costs of high quality coaxial cabling and installation. In US 2016/0126753 A1 it is proposed to circumvent these difficulties by creating a solution in which the transmitters are synchronized wirelessly. However, this solution requires complex and expensive hardware. Additionally, to achieve full field coverage with coherent transmitters, dedicated phase shifters are needed to move the interference hotspots and zeroes through the area, adding to the complexity of the hardware and the time needed for a full inventory. Furthermore, it is unclear whether coherently transmitting readers will pass the regulatory requirements.

BRIEF SUMMARY OF THE INVENTION

The object of this invention is to provide a system which can be applied to allow multiple (UHF) RFID readers to collaborate, thereby efficiently enhancing the coverage area and read performance of the RFID system. The system according to the invention is characterized in that, the system is arranged such that the first reader unit and the at least one second reader unit, in use, each generate their own carrier wave independently from each other, wherein the carrier waves are each modulated with the same interrogation data in a mutually synchronized way.

The fact that the carrier waves are generated independently from each other for example means that the frequencies of the carrier waves are not locked with respect to each other. Thus their frequencies may vary independently from each other. Thus the frequencies of the independently generated carrier waves will generally be different from each other. In particular the carrier waves generated by the reader units are mutually non-synchronized and/or asynchronous. In particular, the carrier waves generated by the reader units have different frequencies. In particular, the units can independently generate their own carrier waves having frequencies which are not controlled to be the same and which are modulated by synchronized and identical interrogation data to be received by tags.

According to a special embodiment the system is provided with a control unit which generates the interrogation data, wherein the control unit is communicatively connected with the first reader unit and the at least one second reader unit for submitting the interrogation data to these reader units. The control unit may be one of the reader units or a unit which is exclusively designed for generating interrogation data.

According to a highly advantageous embodiment the first reader unit is configured to act as a master and the at least one second RFID reader unit is configured to act as a slave, wherein the first reader unit is arranged to generate interrogation data wherein the system is arranged for distributing the interrogation data generated by the first reader unit to the at least one second reader unit, wherein each of the first reader units and the at least one second reader units, in use, generates its own carrier wave, wherein the first reader unit is arranged to modulate the carrier wave generated by the first reader unit with the interrogation data generated by the first reader unit and wherein the at least one second reader unit is arranged to modulate the carrier wave generated by the at least one second reader unit with the interrogation data provided by the first reader unit, such that the first reader unit and the at least one second reader unit each transmit identical and synchronized interrogation data.

The architecture of such a system may be the following: each reader unit generates its own carrier wave, with a frequency that might be but need not be equal to frequencies of the carrier waves generated by other reader units. In general the frequencies of the carrier waves generated by the reader units differ from each other. Thus the frequencies of the carrier waves are non correlated and/or independently generated by each reader unit. The interrogation data is distributed throughout a network formed by the reader units and each reader unit modulates the acquired data onto their own carrier wave. Preferably the role of each reader unit in the network can be configured as master or slave. It is however also possible that a reader unit is fixedly configured as a master unit or slave unit. Also preferably, in addition or alternatively, the operation mode of each reader unit can be set to transmitter, receiver or transceiver.

During an interrogation period, the readers that are configured as master reader units, generate and distribute the interrogation data to the slave units. The reader units that are operating as receivers or as transceivers demodulate the tag reply and may send the acquired data back to the master units or its associated master unit, such that the master unit(s) can determine the next commands to be transmitted. Such command is then part of new to be transmitted interrogation data.

The reader units may be given roles and operation modes at any time. The proposed setup yields a system with the capability to cooperatively power RFID tags without interfering with the communication protocol or compromising the required modulation depth.

This invention is substantially different from the approaches mentioned above. Firstly, distributing the relatively slow interrogation data requires less complicated and expensive hardware and cabling than the distribution of a UHF radio frequency signal. In addition, implementation of this invention requires only small changes to commonly used RFID readers. Secondly, using unsynchronized carrier waves, rather than coherent carrier waves, gives a full coverage of the electromagnetic field in a given area, instead of a checkerboard pattern resulting from coherent addition. Thirdly, since the reader units can preferably be configured as master or slave, installation can be easily planned and managed. Fourthly, since the reader units can preferably be configured as transmitter, receiver or transceiver, installation can be easily planned and managed.

A reader unit according to the invention is characterized in that the reader unit is so arranged that it can act as a master or a slave, wherein if the reader unit acts as a master the processor, in use, generates interrogation data which may be modulated on a carrier wave generated by means of the transmitter wherein the modulated carrier wave is transmitted by means of the transmitter and/or wherein if the reader unit acts as a master the processor provides the generated interrogation data to an output port of the reader unit for submitting the generated interrogation data to another reader unit and wherein if the reader unit acts as a slave the processor, in use, can receive interrogation data from a second outside source not being part of the reader unit for modulating a carrier wave generated by the transmitter and for transmitting the modulated carrier wave by the transmitter and wherein the reader unit is arranged to selectively activate or deactivate the transmitter and wherein the reader unit is arranged to selectively activate or deactivate the receiver. Interrogation data which are synchronized means for example that there is a maximum delay between the interrogation data of half the pulse width of the modulation. Thus synchronization according to the invention implies that the timing difference is small enough such that the tag does not experience the difference or sees it as a problem. More particularly the phase difference is (substantially) zero. Carrier waves which have different frequencies are for example frequencies F1, F2, which differ such that F1<F2. Preferably it further holds that F2 is smaller than $F1+1/T_{int}$, where $T_{int}$ is the time it takes to successfully interrogate a tag, in case two transmitters are operating in the same frequency channel specified by regulatory agencies (e.g. FCC part 15.247/ETSI EN 302208). This improves the ability to read a tag. In particular it also holds that carrier waves may have different frequencies such that they lay in different frequency channels as specified by regulatory agencies (e.g. FCC part 15.247/ETSI EN 302208). Thus, in use, carrier waves which have different frequencies are for example carrier waves with frequencies F1, F2, which differ such that $0<|F2-F1|<1/T_{int}$ where $T_{int}$ is the time it takes to successfully interrogate a tag, in case two transmitters are operating in the same frequency channel specified by regulatory agencies (e.g. FCC part 15.247/ETSI EN 302208), and/or are for example carrier waves with frequencies F1 and F2 such that they are part of different frequency channels as specified by said regulatory bodies.

DETAILED DESCRIPTION OF THE INVENTION

Figure 1:
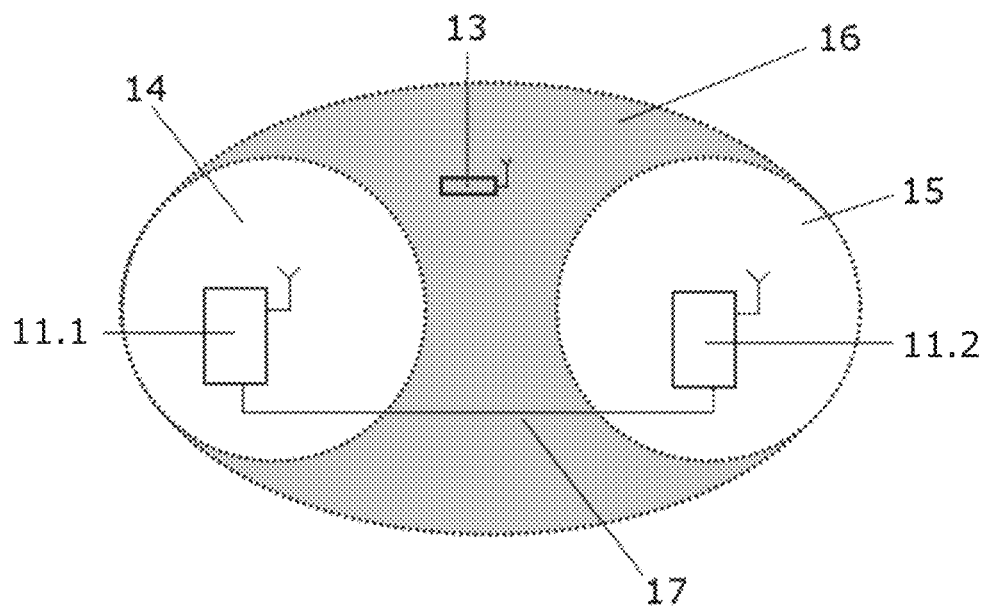
FIG. 1 is a schematic picture showing in a system according to the invention the read range of two individual RFID readers in white and, in grey, the read range that applies when the readers can collectively interrogate the tag.

A schematic illustration of the added value of the invention is given in FIG. 1. UHF RFID reader unit 11.1 and UHF RFID reader unit 11.2 are shown, wherein white circle 14 and circle 15 depict the read ranges associated with the reader unit 11 and the reader unit 12, respectively.

A passive UHF RFID tag 13 is situated outside of the read range of both reader units, and thus, will the tag 13 not be read by the reader units. A grey section 16 illustrates the region where the addition of the powers supplied by reader unit 11.1 and the reader unit 11.2 is sufficient to power the tag 13. However, if both readers are independently trying to interrogate the tag by means of transmitting an interrogation signal, chances of a successful interrogation cycle are slim due to interference of the modulation of the interrogation signals, decrease of the modulation depth and mixing of the communication protocol followed by each reader. The present invention describes a solution for these problems by adding a schematically shown layer of communication 17 between the readers in which the interrogation data is shared and by means of which the interrogation data is synchronized. Even though both readers generate their own carrier waves, which in principle will be unsynchronized, they are able to do a synchronized interrogation of the tag, yielding a high read rate. Each reader transmits an interrogation signal comprising a carrier wave which is modulated with interrogation date. Because the interrogation data modulated on the carrier waves are synchronized, the grey circle provides a range which is larger than the sum of the two white circles 14, 15. The fact that the carrier waves itself are not mutually synchronized (because the carrier waves are generated independently from each other wherein their frequencies are not locked to each other) has no negative impact on the ability of the RFID tag 13 to extract power from the simultaneously transmitted interrogation signals. Thus for providing sufficient power to the tag 13 the carrier waves need not to be synchronized whereas for transmitting the interrogation data to the tag the interrogation data which are modulated on the carrier waves are mutually synchronized. The synchronization of the interrogation data can be realized in several ways as will be discussed hereinafter.

Figure 2:
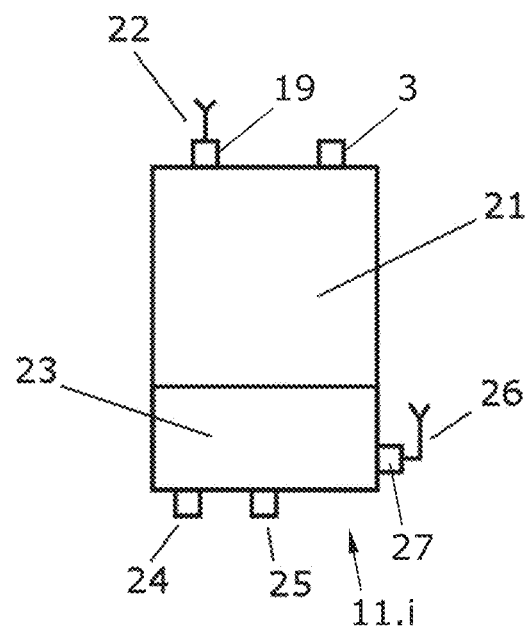
FIG. 2 is a schematic illustration of the RFID reader including a block depicting the modulation interface allowing to distribute the interrogation data to other units in a system according to the invention.

By way of example, FIG. 2 shows a schematic illustration of a possible embodiment of a UHF RFID reader unit 11.$i$ ($i$=1, 2, - - - ) that satisfies this invention. Multiple of such reader units 11.$i$ can be combined into a system according to the invention, an example of which is shown in FIGS. 1, 4-9. The core of the reader unit 11.$i$ is represented by block 21 and includes all the signal generation, amplification and processing that is required to read RFID tags 13. An antenna 19 applied for transmitting and receiving can be connected to connector 22 and there might be an optional receive antenna connector 3 for the purpose of a bi-static configuration. Block 23 depicts the modulation interface, where the interrogation data is generated or wherein external generated interrogation data can be inserted. In order to distribute and receive the interrogation data to and from other reader units 11.$i$ in the network, several communication ports can be envisioned. The block 23 can be provided with a connector 24, 25 and/or 27 as will be discussed below. It may also be that two or three connectors are present and that only one or two are used as will be apparent from the below examples.

In this example, four possibilities are shown for setting up a system according to the invention, but the invention is not limited to these four.

Figure 4:
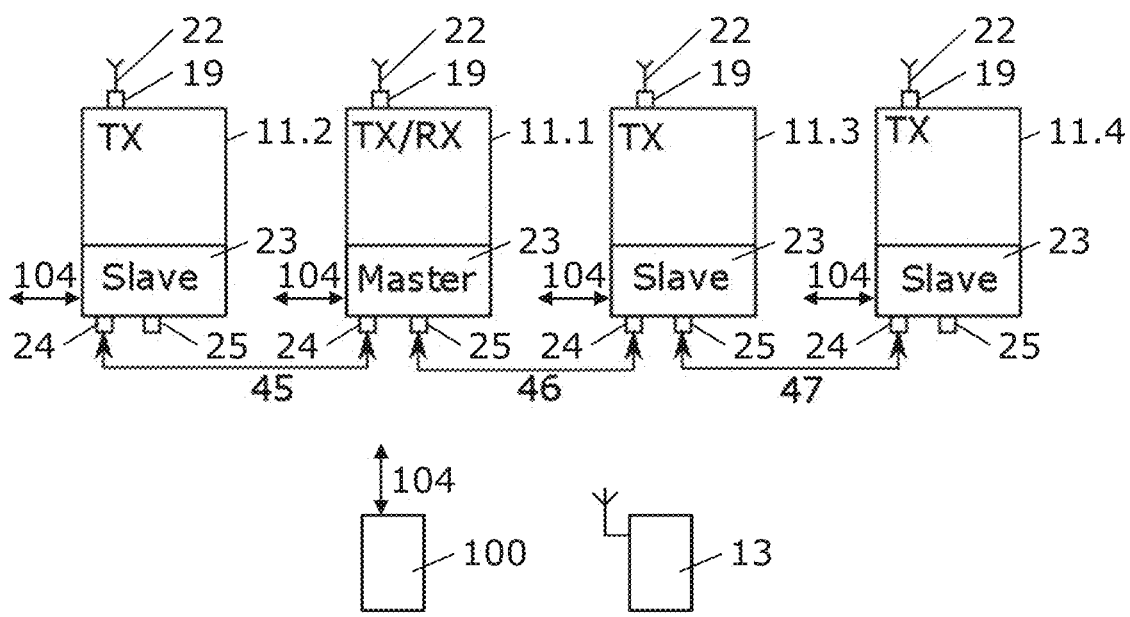
FIG. 4 is a schematic view of a system according to the invention in which the interrogation data is distributed through a chain of readers.

A first possibility is shown in FIG. 4. In case of a wired connection between the reader units in the network, connector 24 and connector 25 can be configured to be both input and/or output for the modulation, such that each reader operates as a switch to obtain a chain network. For example second reader units 11.2, 11.3, 11.4 each operate in a slave mode. In this mode it holds that if an interrogation signal is supplied to connector 24 it functions as an input and this interrogation signal also becomes available on connector 25 which functions as an output. This is shown for reader unit 11.3. For a reader in the slave mode it also holds that if an interrogation signal is supplied to connector 25 it functions as an input and this interrogation signal also becomes available on connector 24 which functions as an output. This is shown for reader unit 11.2. It follows that in this embodiment each second reader unit functions as a slave and could also be referred to as a slave reader unit.

Furthermore first reader unit 11.1 functions in a master mode. This means that the reader unit 11.1 generates an interrogation signal wherein this interrogation signal is made available on connectors 24, 25 which each functions as an output. It follows that in this embodiment the first reader unit functions as a master and could also be referred to as a master reader unit.

In this example, the first reader unit 11.1 also generates its own carrier wave. This carrier wave is modulated with the interrogation signal which is also generated by the reader unit. The modulated carrier wave is transmitted by means of the antenna 22 of the first reader unit 11.1.

The interrogation signal generated by the first reader unit 11.1 is also submitted to the second reader unit 11.2 via wired connection 45. The second reader unit 11.2 also generates its own carrier wave. This carrier wave is modulated with the interrogation signal received via its connector 25. This modulated carrier wave is transmitted by means of the antenna 22 of the second reader unit 11.2. It is noted that the carrier waves of the first reader unit and the second reader unit are not synchronized. Both carrier waves do have different frequencies. The interrogation signal used by the first reader unit 11.1 for modulating its carrier wave is however synchronized with the interrogation signal used by the second reader unit 11.2 for modulating its carrier wave.

The interrogation signal generated by the first reader unit 11.1 is also submitted via wired connection 46 to the second reader unit 11.3. The second reader unit 11.3 also generates its own carrier wave. This carrier wave is modulated with the interrogation signal received via its connector 24. This modulated carrier wave is transmitted by means of the antenna 22 of the second reader unit 11.3. It is noted that the carrier waves of the first reader unit and the third reader unit are not synchronized. This means that both carrier waves do have different frequencies. The interrogation signal used by the first reader unit 11.1 for modulating its carrier wave is however synchronized with the interrogation signal used by the second reader unit 11.3 for modulating its carrier wave.

The interrogation signal generated by the first reader unit 11.1 is submitted via wired connection 46 to connector 24 of the second reader unit 11.3 and from connector 25 of the second reader unit 11.3 to connector 24 of the second reader unit 11.4. The second reader unit 11.4 also generates its own carrier wave. This carrier wave is modulated with the interrogation signal received via its connector 24. This modulated carrier wave is transmitted by means of the antenna 22 of the second reader unit 11.4. It is noted that the carrier waves of the first reader unit 11.1 and the second reader unit 11.4 are not synchronized. Both carrier waves do have however the same (ground) frequency. The interrogation signal used by the first reader unit 11.1 for modulating its carrier wave is however synchronized with the interrogation signal used by the second reader unit 11.4 for modulating its carrier wave.

The carrier waves of the second reader units 11.2-11.4 are also mutually non-synchronized meaning that the carrier waves of all the reader units 11-1-11.4 are non-synchronized. However all these carrier waves are modulated with the same interrogation signal wherein the interrogation signals used by the readers 11.1-11.4 for modulating its respective carrier waves are mutually synchronized.

A tag 13 responds if it receives one or more of the carrier waves by modulating such received carrier waves with reply data and by backscattering (also referred to as transmitting) these modulated carrier waves as a reply signal. The reply data may for example comprise an identification code of the tag. The tag 13 may work according to the known absorption or transmission principle for transmitting the reply signal. In this example the reader unit 11.1 is also configured as a receiver for receiving the reply. In response to the received reply the reader unit 11.1 may send the received reply data for example to a central computer 100 for further processing. The computer 100 is communicatively connected with the reader units 11.i. This connection 104 may be a wired and/or wireless connection (schematically shown). It is also possible that the reader unit 11.1 generates a new interrogation signal, for example comprising a command for the tag 13. The carrier wave generated by the reader unit 11.1 is modulated with the new interrogation signal. This new interrogation signal is also submitted to the readers 11.2-11.4 as discussed above. Each reader 11.2-11.4 modulates its carrier wave with the new interrogation signal as discussed above for the earlier interrogation signal. The command may for example be to measure a temperature if the tag is provided with a temperature sensor. In response the tag 13 may measure the temperature and generate new reply data to be backscattered. In this example the readers 11.2-11.4 are only configured to act as a transmitter. The term reader is therefor related to a unit which comprises a transmitter and/or receiver. In this example the reader units each comprise a receiver however these receivers are configured to be inactive or not being used.

It is however also possible that the reader units 11.2-11.4 are each provided with a receiver which is activated. If for example reader unit 11.3 would receive a reply signal transmitted by the tag 13 the reader unit 11.3 will demodulate the reply signal and will send the received reply data to the reader unit 11.1 via wired connection 46. The reader unit 11.1 may send the received reply data for example to the central computer 100 for further processing. It is also possible that the reader unit 11.1 generates a new interrogation signal, for example comprising a command for the tag 13. Each reader 11.2-11.4 modulates its carrier wave with the new interrogation signal as discussed above for the earlier interrogation signal.

In this example the reader units 11.1-11.4 are identical and comprise a receiver and a transmitter. Each reader may be configured to function in a master mode or slave mode as discussed above. In the example of FIG. 4 the reader unit 11.1 is configured to act as a master and the reader units 11.2-11.4 are configured to act as a slave. Thus in this example configured means the reader unit may also be reconfigured. According to a special embodiment of the invention this holds both for the options master and slave and for the options transmitter used or not, and receiver used or not. If both transmitter and receiver are used this may also be referred to as a transceiver being used. Thus a reader unit 11.i may be configured to act as a slave or a master and may be configured to receive and/or transmit. For example reader unit may be configured as a master wherein the receiver and the transmitter are not used. In that case the master unit only generates the interrogation data to be transmitted by other reader units. In that case for example reader unit 11.2 may be configured as a slave and a transmitter. Reader unit 11.3 may be configured as a slave and a receiver. Reader unit 11.4 may be configured as a slave and a transceiver. Alternatively reader unit 11.1 may also be configured as a transmitter and/or receiver. Whatever happens, the system as a whole should comprise a reader unit having an active transmitter and a reader unit having an active receiver wherein these reader units may be the same.

The (re) configuration can be carried out by an operator, for example by submitting (re)configuration signals to the connector 24 of the reading unit.

It is however also possible that a reader unit cannot be reconfigured with respect to the master and slave mode. In that case such reader unit is fixedly configured to work as a master or slave. It is however also possible that a reading unit can not be reconfigured with respect to its receiver being used (active) or not. In that case such reader unit is provided with an active receiver or no receiver.

Thus in FIG. 4 an example is shown of a system comprising four reader units connected in a chain layout. In the present example the role of reader unit 11.1 is that of a master. The master is set to generate the interrogation data and distribute the data via wired connections (45-47) to the other units, referred to as slaves (reader units 11.2-11.4). Each reader unit will subsequently modulate the data onto its own carrier wave and transmit the signal via its own antenna 19. In this way all units will transmit synchronized interrogation commands to the tag. In this example the operation mode of the master (reader unit 11.1) is set to be the receiving unit. If the interrogation requires multiple commands, such as obtaining an Electronic Product Code (EPC) of a tag in the EPCglobal Class 1 Generation 2 protocol, the master 11.1 will generate new interrogation data according to the received tag reply and again distribute these to each unit in the network. In this particular embodiment the master may be the only unit capable of receiving the tag reply, but the invention is certainly not limited to a single receiving unit; as discussed the reader units 11.2-11.4 may also be provided with a receiver which is active.

Figure 5:
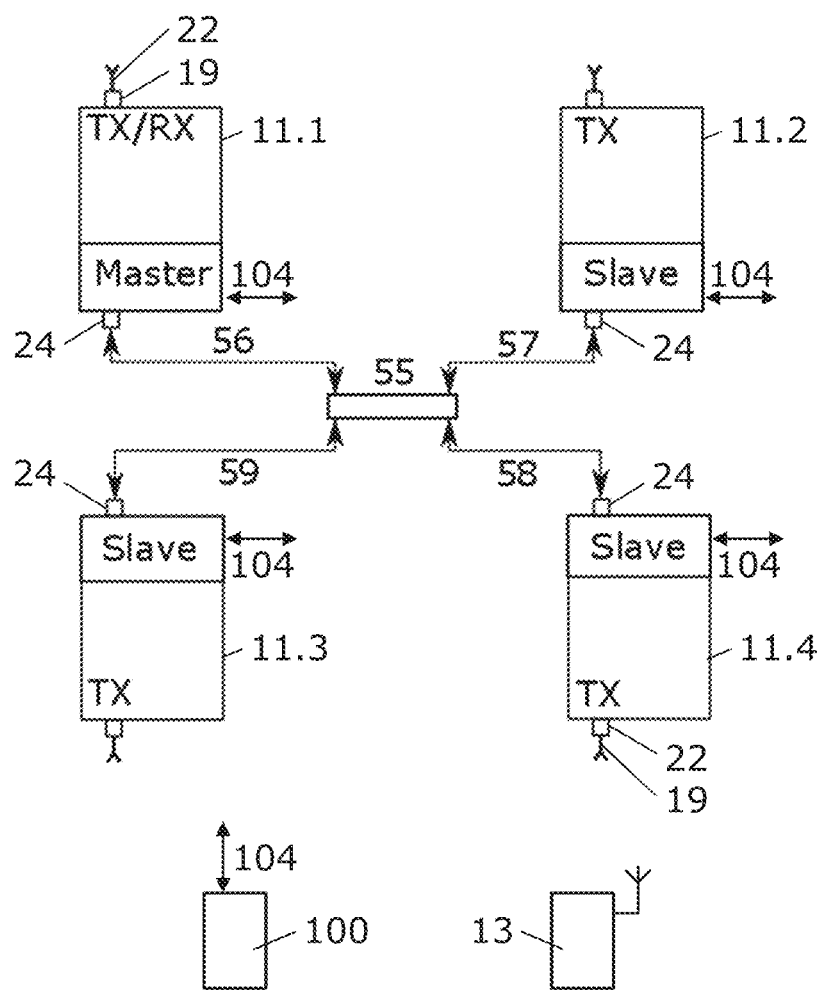
FIG. 5 is a schematic view of a system according to the invention in which the readers form a star network and the interrogation data is distributed with the aid of a communication interface connecting the cables from all readers, e.g. a switch.

A second example is shown in FIG. 5 wherein the readers are connected in a star network configuration, either 24 or 25 will be superfluous and one of the two connectors may be omitted (as shown in FIG. 5 for connector 25) or not being used. In the example of FIG. 5 an external switch 55 can be used to facilitate the connection to all units by means of respective wired connection 56-58. In FIG. 5 the reader units 11.1-11.4 operate in the same manner as discussed for the system according to FIG. 4. The difference is that the interrogation data generated by reader unit 11.1 is submitted to each of the reader units 11.2-11.4 via the switch 55. Also possible reply data received by the reader units 11.2-11.4 is submitted to the reader unit 11.1 via the switch 55.

Thus FIG. 5 depicts another embodiment of a system similar to that shown in FIG. 4. In FIG. 5 the units are wired in a star network configuration. In this case, the readers 11.1-11.4 require only a single wired modulation connection and an external switch (55) is used to allow distribution to all units via wired connections 56-59. A practical implementation of this embodiment can be, but is not limited to, the use of Ethernet as a communication interface for the modulation and use of an off-the-shelf Ethernet switch to connect the units.

Figure 6:
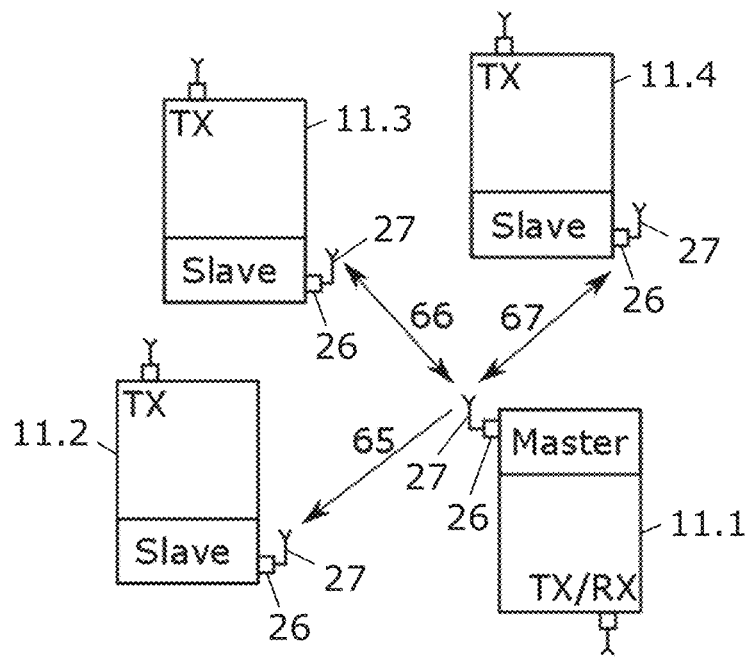
FIG. 6 is a schematic view of a system according to the invention in which the interrogation data is distributed wirelessly to the readers.

A third example is shown in FIG. 6 wherein a system is shown which comprises a wireless connection for the transmission of interrogation data generated by the first reader unit 11.1 to the reader units 11.2.11.4. A possible reply received by any of the reader units 11.2-11.4 may be transmitted to the reader unit 11.1 via the same wireless connection. To this extent an antenna 27 can be connected to connector 26.

Thus another embodiment of the present invention is shown in FIG. 6 where a wireless connection is used for the distribution of the interrogation data. As indicated each reader unit is equipped with an additional antenna 26 for this purpose. Wireless connections 65-67 are formed, over which the modulation data can be distributed, possibly also the reply data received by any of the reader units 11.2-11.4 to the reader unit 11.1.

Figure 9:
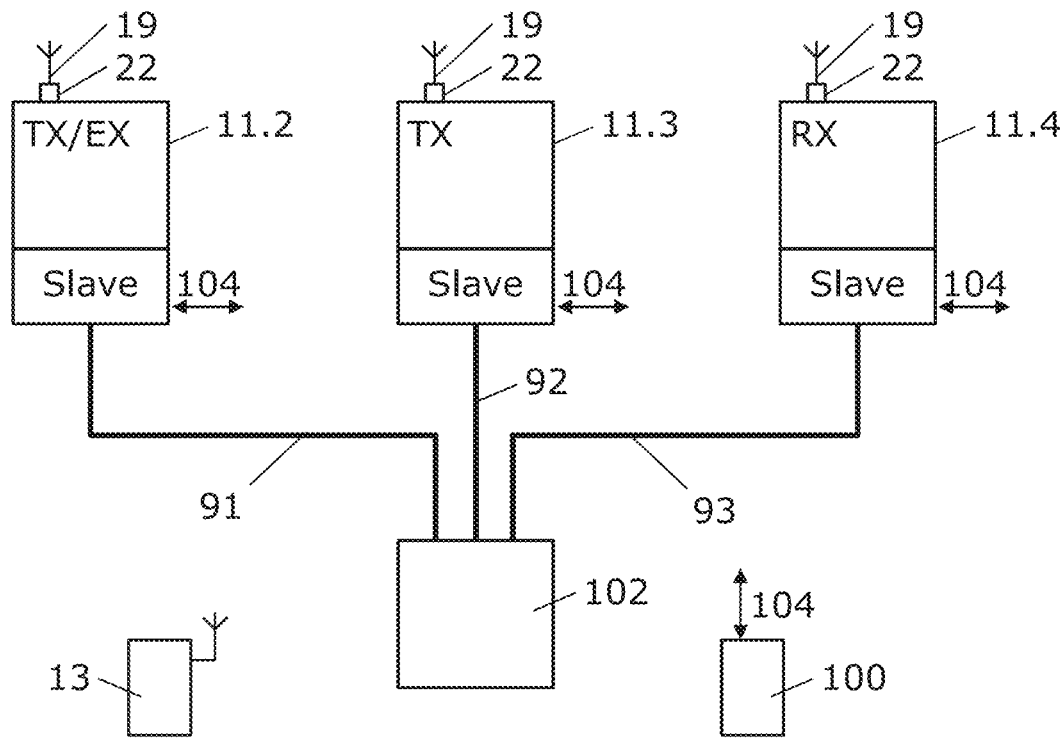
FIG. 9 illustrates a general system configuration according to the invention which includes a combination of (slave) readers which are controlled by a central control unit.

Another example is shown in FIG. 9. In this example all reader units 11.2-11.3 are configured to act as a slave reader unit. Reader unit 11.2 acts as a transceiver for transmitting the modulated carrier wave and for receiving a reply signal from the tag 13. Reader unit 11.3 acts as a transmitter for transmitting the modulated carrier wave. Reader unit 11.4 acts as a receiver for receiving a reply signal from the tag 13. The reader units 11.2-11.4 are communicatively connected with a central processor 102 via connection lines 91-93 which may be wired or wireless communication lines. The central processor acts as a master and generates the interrogation data which is submitted to each of the reader units 11.2-11.4. Each of the reader units 11.2-11.3 modulates its own generated carrier wave with the interrogation data for transmission. A reply of a tag which is received by the reader unit 11.2 and/or 11.4 is submitted to the central processor 102 for further processing. The central processor may generate in response to the received reply data a command for the tag 13 which is submitted as new interrogation data to the reader units 11.2 and 11.3 for transmission. Also the processor 102 may submit the reply data to a central computer 110.

It is noted that optionally the control unit is one of the plurality of reader units provided with a receiver for receiving a reply signal and/or a transmitter for generating its own carrier wave, modulating its own carrier wave with the interrogation data and for transmitting its own modulated carrier wave. One or more of the reader units 11.2-11.3 may be deleted from the system as long as transmitting a carrier wave modulated with the interrogation data and receiving a reply within the system remains possible. This holds in general for each system according to the invention.

Note that in the examples connections 24 and, 25 may all allow bidirectional communication, such that all units are able to send and receive the modulation data to their neighbors. For the purpose of clarity in the present example, 23 is illustrated as a separate block that is attached to 21 but in likely embodiments of the invention 23 will be a part of 21 (see FIG. 2).

Figure 7:
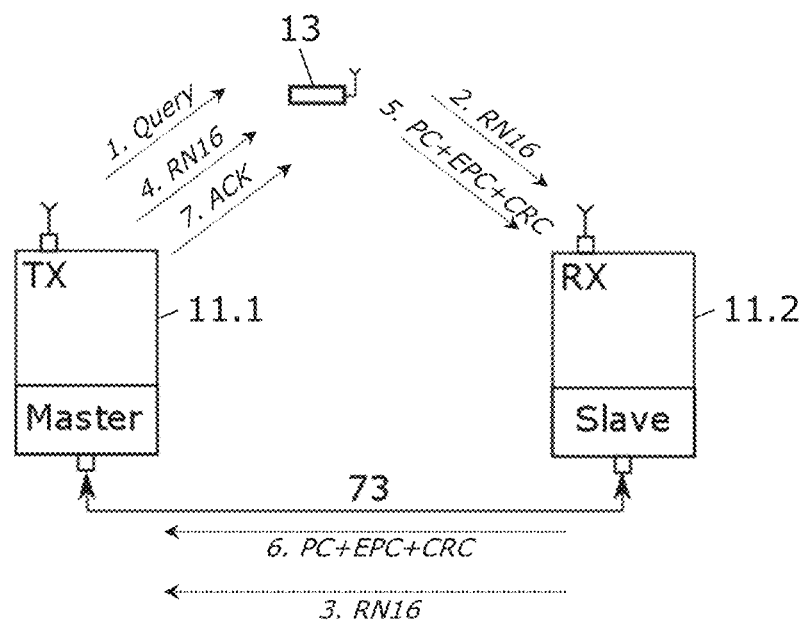
FIG. 7 is a schematic picture showing an example of a transmission setup in which one reader is configured as transmitter and the other is configured to be the receiver in a system according to the invention.

Embodiments of the invention are not limited to operating only the master unit as transceiver as was shown in the examples above, but the possibility to distribute the interrogation data generally allows to create a system with any number of transmitters, receivers and transceivers. FIG. 7 schematically illustrates a transmission setup where reader unit 11.1 is operating as transmitter and reader unit 11.2 is operating as receiver. The interrogation data is shared between units 11.1 and 11.2 with the aid of connection 73, allowing bidirectional communication. For the sake of clarity and by way of example, the commands that will be transmitted in a tag interrogation cycle using the EPCglobal Class 1 Generation 2 protocol, are added to the figure. However this is merely an example, other protocols are also possible. Reader unit 11.1, which role is master, starts with transmitting a Query command which is received by the tag 13. The tag replies an RN16 via backscatter modulation, which is in turn received by reader unit 11.22. Reader unit 11.2 demodulates the tag reply and communicates the obtained RN16 value to reader unit 11.1. Reader unit 11.1 then acknowledges receiving the RN16 by transmitting this back to the tag 13. The tag 13 verifies whether or not the RN16 transmitted by unit 11.1 is correct, and if so, replies by backscattering a Protocol Control word, the EPC and the CRC check. Again, reader unit 11.2 demodulates the tag reply and sends the acquired data to reader unit 11.1 via connection 73. Finally, if the CRC checks out, reader unit 11.1 transmits an ACK command and the tag 13 sets its inventoried flag.

Figure 8:
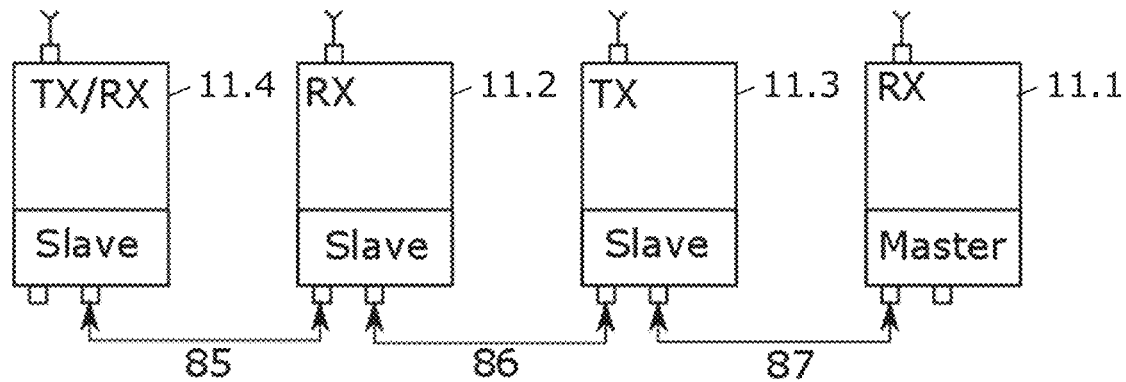
FIG. 8 illustrates a general system configuration according to the invention which includes a combination of readers configured as transmitter only, receiver only or transceiver.

As an illustration of the plethora of possibilities of the invention, FIG. 8 shows yet another configuration of the system. Again the reader units can preferably be (re)configured to its special role as master or slave and as receiver, transmitter or transmitter+receiver (=transceiver). A system of four RFID reader units is depicted, in which the operating mode of unit reader 11.1 is set to receiver, that of reader unit 11.2 as receiver, that of reader unit 11.3 as transmitter and that of reader unit 11.4 as transceiver. Furthermore, the role of reader unit 11.1 is in this example set to master and the roles of the other reader units 11.2-11.4 are set as slave. The bi-directional communication lines 85, 86, and 87, facilitate the distribution of the interrogation data. Since in this example the master reader unit 11.1 is configured to operate as a receiver, this unit will take care of the protocol handling and distributes the commands intended for transmission to units 11.3, 11.4. Tag replies can be received by units 11.1, 11.2 and 11.4. After demodulation, each of the reader units 11.2 and 11.4 will send the acquired data to the master, unit 11.1. Having multiple receiver units, opens up the possibility to separately process the information from each receiver, e.g., if two out of three receivers from receiver units 11.1, 11.2, 11.4 agree on the RN16 backscattered by the tag, one could decide to only continue with these two receivers. Alternatively, if the receivers disagree on the RN16, this might also be an indication of a collision in the medium access control, as consequence of which it could be decided to increase the number of time slots, e.g. by increasing the Q-value in the EPCglobal Class 1 Generation 2 protocol.

Finally, the embodiment is not limited to having only a single master unit. In larger installations the system could decide that individual readers are spaced apart far enough for multiple master units to be active at any given time, with each of the master units controlling a subset of the available transceivers. Which masters are active could be different from interrogation to interrogation.

Figure 3:
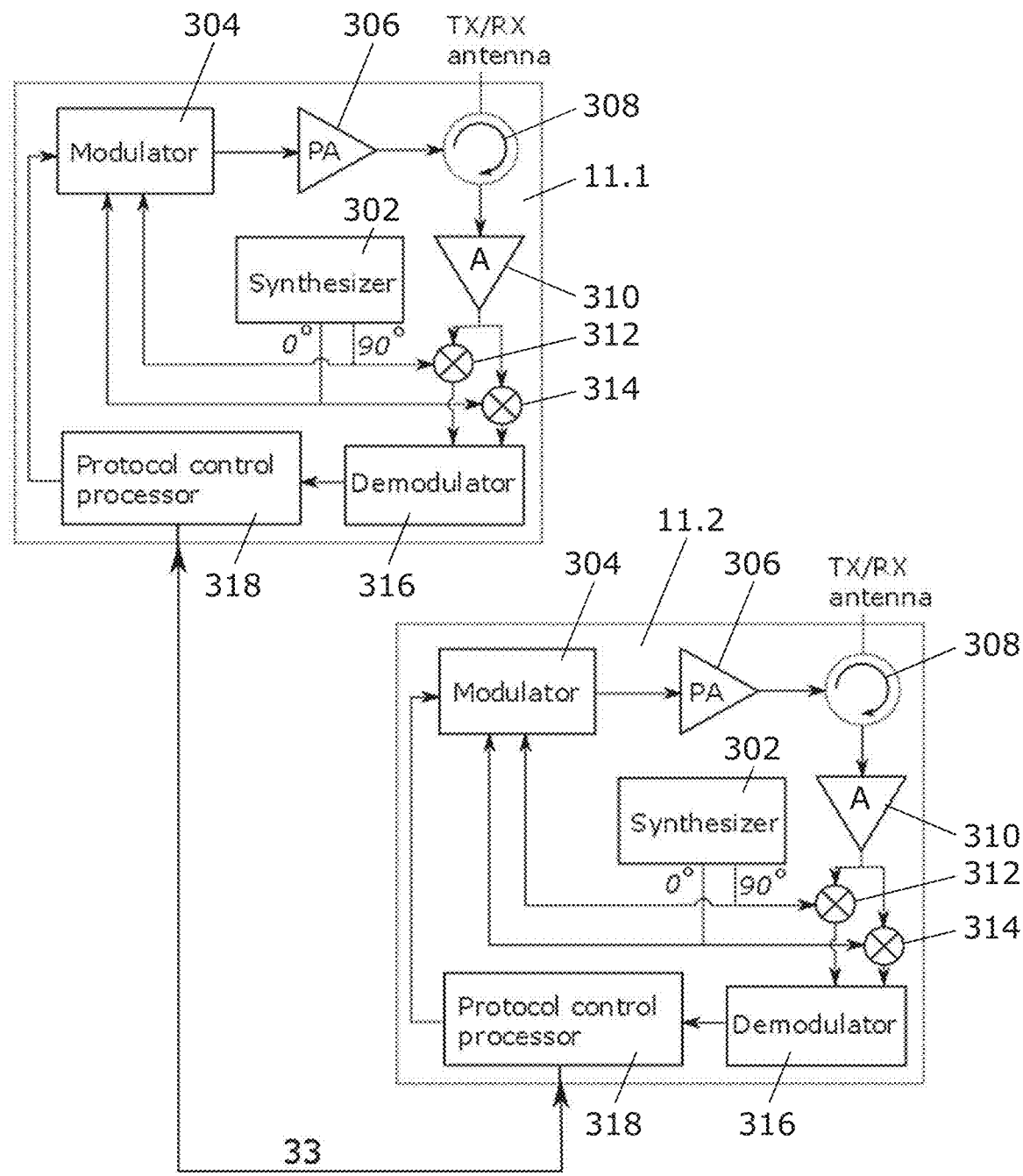
FIG. 3 shows a block diagram of a possible implementation of two RFID readers that are capable of distributing the modulation data in a system according to the invention.

FIG. 3 shows a more detailed block diagram of how a possible reader unit 11.1 implementation to be used in each of the above discussed embodiments may look like. Note that this diagram is only shown here to clearly illustrate the invention and that possible embodiments are not limited to the represented implementation. Two readers are shown, reader 11.1 and reader 11.2, which are connected via a connection 33 (this may be any of the connections 45-47, 56-58, 65-67, 73, 85-87, 95-97 discussed above).

The core of the reader unit 11.*i* (i=1,2) comprises a synthesizer 302 that generates the radio frequency carrier wave, a modulator 304 which modulates the interrogation data onto the carrier wave, a power amplifier 306 to amplify the signal to the desired output power, a circulator 308 to isolate the transmit and receive section of the reader unit, an amplifier 310 to amplify the received tag reply to a desired power, two mixers 312, 314 for the purpose of I/Q mixing and a demodulator 316 to obtain the data that is backscattered by the tag. The reader unit 11.*i* further comprises a protocol control processor 318. This processor 318 controls whether the reader unit 11.*i* acts as a master or a slave. It also controls whether the reader unit 11.*i*, in use, transmits and/or receives modulated carrier waves. It may generate the interrogation data if the reader unit acts as a master. In that case it may interpret the tag reply data obtained by its demodulator or received via the connection 33 from another reader unit which acts as a slave. It may decide which commands to send next if its reader unit acts as a master. In that case this command is provided as a newly generated interrogation signal which is used to modulate the carrier wave generated by its associated master. This interrogation data is also submitted to other reader unit(s) 11.2 via the connection 33. If the reader functions as a slave (such as reader unit 11.2) the processor 318 of this reader establishes that the interrogation data which is received from the reader unit which acts as a master is modulated on the carrier wave generated by the synthesizer 302 of the reader unit 11.2. Also the demodulator 316 of the reader unit 11.2 provides the received reply signal to the processor 318 of the reader unit 11.2 and this processor submits this reply signal to the processor 318 of the reader unit 11.1 for further processing as discussed above, such as transmission of the reply signal to the central computer and/or generating a new interrogations signal (which may comprise a command for the tag 13).

In the above embodiments, for example with respect to FIG. 8, the system is arranged such that a receiver of the at least one second reader unit 11.2, 11.4 demodulates a received first reply signal of a tag to obtain a first reply wherein the at least one second reader unit sends the first reply to the first reader unit 11.1. The first reader unit 11.1 determines based on the first reply possible new interrogation data to be transmitted next by means of the first reader unit 11.1 or the at least one second reader unit 11.3, 11.4 or by the first reader unit 11.1 and the at least one second reader unit 11.3, 11.4 in a synchronized manner. Optionally the system of FIG. 8 may be arranged such that the tag generates a second reply signal which may be received and processed by the reader units as discussed for the first reply signal.

Additionally or alternatively in the above embodiments, for example with respect to FIG. 8, the system may be arranged such that a receiver of the at least one second reader unit 11.2, 11.4 receives a first reply signal of a tag wherein the at least one second reader unit 11.2, 11.4 sends the received first reply signal to the first reader unit 11.1. The first reader unit 11.1 demodulates the first reply signal obtained from the at least one second reader unit 11.2, 11.4 to obtain a first reply wherein optionally a receiver of the first reader unit 11.1 receives the first reply signal of the tag wherein the first reader unit 11.1 demodulates the first reply signal received by the first reader unit 11.1 to obtain a first reply. Optionally the system, more particularly the first reader unit 11.1, is arranged to compare all the first replies to obtain a single first reply wherein optionally the comparison of the first replies to obtain the single first reply is carried out in a known manner. For example if two first replies are the same and differ from another first reply the first replies which are the same are accepted as the true first reply and this true first reply is the single first reply obtained. Thus for example based on all the obtained first replies statistically the true first reply may be obtained based on statistical analyses.

Additionally or alternatively in the above embodiments, for example with respect to FIG. 8, the system may be arranged such that receivers of a plurality of second reader units 11.2, 11.4 each receive a first reply signal of a tag wherein each of the second reader units 11.2, 11.4 demodulates the received first reply signals to obtain first replies respectively and wherein each of the second reader units 11.2,11.4 submits its generated first reply to the first reader unit 11.1 Optionally a receiver of the first reader unit 11,1 also receives the first reply signal of the tag wherein the first reader unit 11.1 demodulates the first reply signal received by the first reader unit 11.1 to obtain a first reply. Optionally the system, more particularly the first reader unit 11.1, is arranged to compare all the first replies to obtain a single first reply wherein optionally the comparison of the first replies to obtain the single first reply is carried out in a known manner, for example as discussed above.

Additionally or alternatively in the above embodiments, for example with respect to FIG. 8, the system may be arranged such that receivers of a plurality of second reader units 11.2, 11.4 each receive a first reply signal of a tag wherein each of these second reader units 11.2, 11.4 sends the received first reply signal to the first reader unit. The first reader unit 11.1 demodulates the first reply signals obtained from the second reader units to obtain a plurality of first replies. Optionally a receiver of the first reader unit 11.1 also receives the first reply signal of the tag wherein the first reader unit demodulates the first reply signal received by the first reader unit 11.1 to obtain a first reply. Optionally the system, more particularly the first reader unit 11.1, is arranged to compare the first replies to obtain a single first reply wherein optionally the comparison of the first replies to obtain the single first reply is carried out in a known manner, for example as discussed above.

In the above examples the carrier waves have frequencies which lay in the UHF band. The carrier waves have different frequencies. The carrier waves may however also be in mutually different frequency bands.

The invention claimed is:

1. A system of RFID reader units, comprising a plurality of reader units at least comprising a first reader unit provided with a transmitter for transmitting an electromagnetic interrogation signal comprising a carrier wave which is modulated with interrogation data for interrogating an RFID tag and at least one second reader unit provided with a transmitter for transmitting an electromagnetic interrogation signal comprising a carrier wave which is modulated with interrogation data for interrogating an RFID tag, wherein the system is arranged to receive a reply signal generated by an RFID tag in response to a carrier wave modulated with the interrogation signal received by the tag, wherein the system is arranged such that the first reader unit and the at least one second reader unit, in use, each generate a respective proper carrier wave independently from each other, wherein the carrier waves generated by the first reader unit and the at least one second reader unit are each modulated with identical interrogation data in a mutually synchronized way.

2. The system according to claim 1, wherein the carrier waves generated by the first reader unit and the at least one second reader unit are mutually non-synchronized or asynchronous or non correlated or independently generated by each reader unit.

3. The system according to claim 1, wherein the carrier waves generated by the first reader unit and the at least one second reader unit respectively have different frequencies.

4. The system according to claim 1, wherein the system is provided with a control unit which generates the interrogation data, wherein the control unit is communicatively connected with the first reader unit and the at least one second reader unit for submitting the interrogation data to the first reader and to the at least one second reader unit wherein the control unit is one of the plurality of reader units provided with a receiver for receiving a reply signal or a transmitter for generating a proper carrier wave, modulating the proper carrier wave with the interrogation data to generate a proper modulated carrier wave and for transmitting the proper modulated carrier wave.

5. The system according to claim 4, wherein the system is provided with a wired or wireless connection between the first reader unit, the at least one second reader unit and the control unit for distributing the interrogation data over the first reader units and the at least one second reader unit.

6. The system according to claim 1, wherein the first reader unit is provided with a receiver for receiving the reply signal or the at least one second reader unit is provided with a receiver for receiving the reply signal.

7. The system according to claim 1, wherein the first reader unit is configured to act as a master and the at least one second RFID reader unit is configured to act as a slave, wherein the first reader unit is arranged to generate interrogation data wherein the system is arranged for distributing the interrogation data generated by the first reader unit to the at least one second reader unit, wherein the first reader unit and the at least one second reader unit are each arranged to generate a respective proper carrier wave, wherein the first reader unit is arranged to modulate the carrier wave generated by the first reader unit with the interrogation data generated by the first reader unit and wherein the at least one second reader unit is arranged to modulate the carrier wave generated by the at least one second reader unit with the interrogation data provided by the first reader unit, such that the first reader unit and the at least one second reader unit are each able to transmit identical and synchronized interrogation data.

8. The system according to claim 7, wherein the carrier waves generated by the first reader unit and the at least one second reader unit are mutually non-synchronized or asynchronous.

9. The system according to claim 7, wherein the carrier waves generated by the first reader unit and the at least one second reader unit have different frequencies.

10. The system according to claim 7, wherein at least one of the reader units comprises a receiver for receiving a signal generated by a tag in response to an interrogation signal received by the tag, wherein:

the system is arranged such that a receiver of the at least one second reader unit demodulates a received first reply signal of a tag to obtain a first reply wherein the at least one second reader unit sends the first reply to the first reader unit, wherein the first reader unit based on the first reply is enabled to determine new interrogation data to be transmitted next by means of the first reader unit or the at least one second reader unit or by the first reader unit and the at least one second reader unit in a synchronized manner; or the system is arranged such that a receiver of the at least one second reader unit receives a first reply signal of a tag wherein the at least one second reader unit sends the received first reply signal to the first reader unit, wherein the first reader unit demodulates the first reply signal obtained from the at least one second reader unit to obtain a first reply wherein optionally a receiver of the first reader unit receives the first reply signal of the tag wherein the first reader unit demodulates the first reply signal received by the first reader unit to obtain a first reply or the system is arranged such that receivers of a plurality of second reader units each receive a first reply signal of a tag wherein each of the second reader units demodulates the received first reply signals to obtain a respective first reply respectively and wherein each of the second reader units submits the respective first reply to the first reader unit or the system is arranged such that receivers of a plurality of second reader units each receive a first reply signal of a tag wherein each of the second reader units sends the received first reply signal to the first reader unit, wherein the first reader unit demodulates the first reply signals obtained from the second reader units to obtain a plurality of first replies.

11. The system according to claim 7, wherein the system is provided with a plurality of second reader units.

12. The system according to claim 7, wherein the system comprises at least one reader unit which is arranged to selectively act as a master or slave.

13. The system according to claim 7, wherein the system is provided with a wired or wireless connection between the first reader unit and the at least one second reader unit for distributing the interrogation data to the at least one second reader unit.

14. The system according to claim 7, wherein the system is provided with a plurality of first reader units which each, in use, act as a master unit at any given time, wherein the system is arranged such that each first reader unit controls an associated subset of the total available second reader units.

15. The system according to claim 14, wherein at least one of the reader units is arranged to be re-configured, after any number of interrogation cycles.

16. The system according to claim 7, wherein the system is arranged such that at least one of the first reader units is re-configured, after any number of interrogation cycles, into a second reader unit which operates as a slave.

17. The system according to claim 7, wherein the system is arranged such that at least one of the second reader units is re-configured, after any number of interrogation cycles, into a first reader unit which operates as a master.

18. The system according to claim 7, wherein at least one of the reader units is arranged to be selectively configured into a first reader unit in order to operate as a master or configured into a second reader unit in order to operate as a slave.

19. A reader unit for use in the system according to claim 7, the reader unit comprising a transmitter, receiver and a processor, the reader unit being configurable in a configuration selected from a first configuration wherein the reader unit acts a master and a second configuration wherein the reader unit acts as a slave, wherein with the reader unit in the first configuration, the processor, in use, generates interrogation data which may be modulated on a carrier wave generated by means of the transmitter wherein the modulated carrier wave is transmitted by means of the transmitter or wherein with the reader unit in the first configuration, the processor, in use, provides the generated interrogation data to an output port of the reader unit for submitting the generated interrogation data to another reader unit and wherein-if with the reader unit in the second configuration the processor, in use, receives interrogation data from a second outside source not being part of the reader unit for modulating a carrier wave generated by the transmitter and for transmitting the modulated carrier wave by the transmitter and wherein the reader unit is arranged to selectively activate or deactivate the transmitter and wherein the reader unit is arranged to selectively activate or deactivate the receiver.

20. The system according to claim 1, wherein at least one of the reader units is arranged to selectively operate as a transmitter only, a receiver only, or both as a transmitter and receiver in combination.

21. The system according to claim 1, wherein the collection of frequencies of the carrier waves generated by the reader units are all the same or comprise different frequencies.

22. The system according to claim 1, wherein at least one of the reader units, a plurality of the reader units or each reader unit is provided with a beamforming antenna.

23. The system according to claim 22, wherein a reader unit which is provided with a beam forming antenna is arranged to switch between multiple beams wherein a beam is a receiver beam or a transmitter beam.

24. The system according to claim 1, wherein at least one of the reader units, a plurality of the reader units or each reader unit is provided with multiple antennas and a multiplexer wherein the transmitter or receiver of a reader unit is connected to the multiple antennas via a multiplexer to switch between multiple beams wherein a beam is a receiver beam or a transmitter beam.

25. The system according to claim 1, wherein at least one of the reader units, a plurality of the reader units or each reader unit is a UHF RFID reader unit.

\* \* \* \* \*